United States Patent [19]

Plachy

[11] Patent Number: 5,166,848
[45] Date of Patent: Nov. 24, 1992

[54] AUTOMATIC SCAN TRACKING MECHANISM

[75] Inventor: Ivo T. Plachy, San Carlos, Calif.

[73] Assignee: Ampex Systems Corporation, Redwood City, Calif.

[21] Appl. No.: 592,086

[22] Filed: Oct. 3, 1990

[51] Int. Cl.$^5$ .................. G11B 21/24; G11B 5/588
[52] U.S. Cl. .................. 360/109; 360/77.16
[58] Field of Search .................. 360/104, 109, 77.16

[56] References Cited

U.S. PATENT DOCUMENTS

| | | | |
|---|---|---|---|
| 3,140,362 | 7/1964 | Cheney et al. | 360/109 |
| 4,099,211 | 7/1978 | Hathaway | 360/109 |
| 4,151,569 | 4/1979 | Hathaway | 360/77.16 |
| 4,212,043 | 7/1980 | Baker | 360/104 |
| 4,268,880 | 5/1981 | Majima | 360/109 |
| 4,337,492 | 6/1982 | Brookhart et al. | 360/109 |
| 4,363,046 | 12/1982 | Saito | 360/106 |
| 4,365,279 | 12/1982 | Kinjo | 360/109 |

FOREIGN PATENT DOCUMENTS 57-60527 4/1982 Japan .................. 360/109

OTHER PUBLICATIONS

"Video Tape Recording with Oscillating Head" by G. E. Price, IBM Tech. Disc. Bull., vol. 12, No. 1 Jun., 1969.

Primary Examiner—Alyssa H. Bowler
Assistant Examiner—David L. Robertson
Attorney, Agent, or Firm—Douglas M. Gilbert

[57] ABSTRACT

An improved head mounting structure which disposes a beam-like head support assembly for movement about a center hinge. A magnetic recording head is supported at an outer end of the head support beam assembly and a moving coil is supported at an opposite, inner end of the head support beam assembly. A motor drive assembly is disposed at the inner end of the head mounting structure to drive the coil and thereby induce corresponding movement in the head.

22 Claims, 3 Drawing Sheets

AUTOMATIC SCAN TRACKING MECHANISM

BACKGROUND OF THE INVENTION

The present invention relates generally to read and write transducers, and more particularly to an improved transducer head support structure for use in helical tape recorders.

In many data and video tape recorders some automatic tracking mechanism is often used to maintain the position of the transducer head on a predetermined linear or curvilinear magnetic track. Tracking is a particularly acute problem in helical tape recorders when the recorded tracks on the tape have been distorted, as by temperature or humidity-induced dimensional changes in the tape, or by faulty tensioning mechanisms in the tape transport. In addition, specialized features of a tape recorder, such as slow-motion record and playback or stop motion playback, dictate that the head or heads jump or skip tracks in a predetermined pattern. As the head reads from successive tracks it is critically important that the head retain its alignment with the respective track to insure an optimum output of the information carried by the tape. Also operating against the accuracy of such alignment are external factors such as tape tension, tape speed, humidity, etc.

Accordingly, it is desirable to simplify the structure associated with supporting the head for tracking the individual tracks disposed on the tape, to enable the head to accurately maintain alignment with the paths of individual tracks so as to correctly read the data carried on the magnetic recording media. One well-known form of head support structure is a single cantilevered arm having one or more magnetic heads mounted at the outer end thereof. The cantilevered arm comprises a flexure member connected to a rigid member. The deflection of the cantilevered arm is caused by a linear motor disposed adjacent to the head. When the magnet associated with the linear motor is proximate to the head, the resulting magnetic interference can adversely affect the output of the head.

Furthermore, the disposition of the magnet adjacent to the head at the outer end of the head support member places a relatively large mass near the outer periphery of the scanner drum and subjects the support member to centrifugal forces associated with the rotary movement of the scanner drum. Such forces are significant for a drum rotating as high as 6000 rpm, which necessitates a bulkier structural design than otherwise would be needed.

Additionally, in a vibrational environment, the motion component parallel to the rotational axis of the scanner has a tendency to displace the head from its normal operative position. In a cantilevered structure, active servo circuits associated with head position must compensate for this motion.

SUMMARY OF THE INVENTION

Accordingly the structure contemplated by the present invention provides a new and particularly advantageous solution to the aforementioned vibration problem.

In one aspect the present invention, an improved magnetic head support structure has the motor components along with the associated magnetic field, disposed remote from the magnetic head thus reducing potential magnetic interference. Moreover, such a structure provides the additional advantage of disposing the heavy motor components nearer to the axis of scanner assembly rotation, thereby substantially reducing the centrifugal forces exerted on these components by scanner rotation.

Additional advantages accrue, such as minimizing the centrifugal forces in the scanner assembly, when the structure which locates the motor components remote from the head departs from the cantilevered structure of earlier head mounting structures, and places the head and the motor on opposite sides of a central hinge point.

Accordingly, it is desirable to provide a head support structure which minimizes undesirable bending thereof by providing a flex hinge between substantially stiffened front and rear portions of a beam flexure member, said front and rear portions being sufficiently stiffened as to minimize bending therein, thereby to concentrate bending at the flex hinge, to better control head movement in the head mounting structure.

In a cantilevered structure, when the head is displaced from its centered position, there are no compensating forces opposing the centrifugal forces produced by the rotation of the scanner and which act to force the head to its centered position. In the center hinge structure of the present invention, forces operating against the head on one side of the hinge are at least partially balanced by forces operating against motor components such as the coil on the opposite side of the hinge. That is, gravitational or "g" forces exerted on the head by the rotation of the scanner are at least partially offset by opposing "g" forces exerted on the moving coil of the motor components.

In the hinged structure of the present invention, balancing the moments around the hinge point balances the forces at opposite ends of the hinge support arm and thus minimize the motion effect noted above, doing so without substantial additional servo requirements.

In accordance with the present invention, an improved head mounting structure provides a simplified construction in which the magnetic head is mounted at an outer end of an elongated flex plate or beam flexure member. The flex plate is supported approximately at its mid-portion by beam support members extending from a base plate of the structure with outer flex plate clamp plates cooperating to stiffen an outer portion of the flex plate therebetween and inner flex plate clamp plates cooperating with the beam support members to stiffen an inner portion of the flex plate therebetween, thereby to define a flex hinge between the stiffened outer and inner flex plate portions and generally at a mid-portion of the flex plate. At the inner end of the improved head mounting structure, a flat moving coil is held in place by beams or beamlike extensions of the outer flex plate clamp plates which extend between and rearwardly of the spaced beam support members to dispose the coil at an inner end of the beams, between respective magnets and magnet pole pieces of a motor drive assembly for driving the head.

The improved head mounting structure of the present invention stiffens front and rear portions of the beam flexure member to minimize undesirable bending along the member and to substantially concentrate bending at the flex hinge disposed generally at a mid-portion of the beam flexure member. The improved head mounting structure also places the magnets and the moving coil of the motor drive assembly at an inner end of the head mounting structure behind the beam support members and at an opposite end of the assembly from the magnetic recording head, so as to substantially distance the motor drive assembly away from the magnetic recording head to minimize magnetic interference with the head output. The improved head mounting structure also comprises a series of easily formed and easily assembled parts which can readily be replaced as a unit.

Moreover, the improved head mounting structure of the present invention disposes the heaviest parts of the head mounting structure, that is, the magnets and magnet pole pieces of the motor drive assembly, at the inner end of the improved head mounting structure, adjacent to the rotational axis of the scanner drum and remote from the head so as to minimize the effects on the drive assembly of centrifugal forces resulting from rotation of the scanning drum. Also, with the structure balanced, the effects of externally induced vibrations on the structure are substantially minimized.

Other features and advantages of the present invention will become more apparent from the following detailed description of the head mounting structure, taken in conjunction with the accompanying drawings which illustrate, by way of example, the principles of the invention.

DETAILED DESCRIPTION

Figure 1:
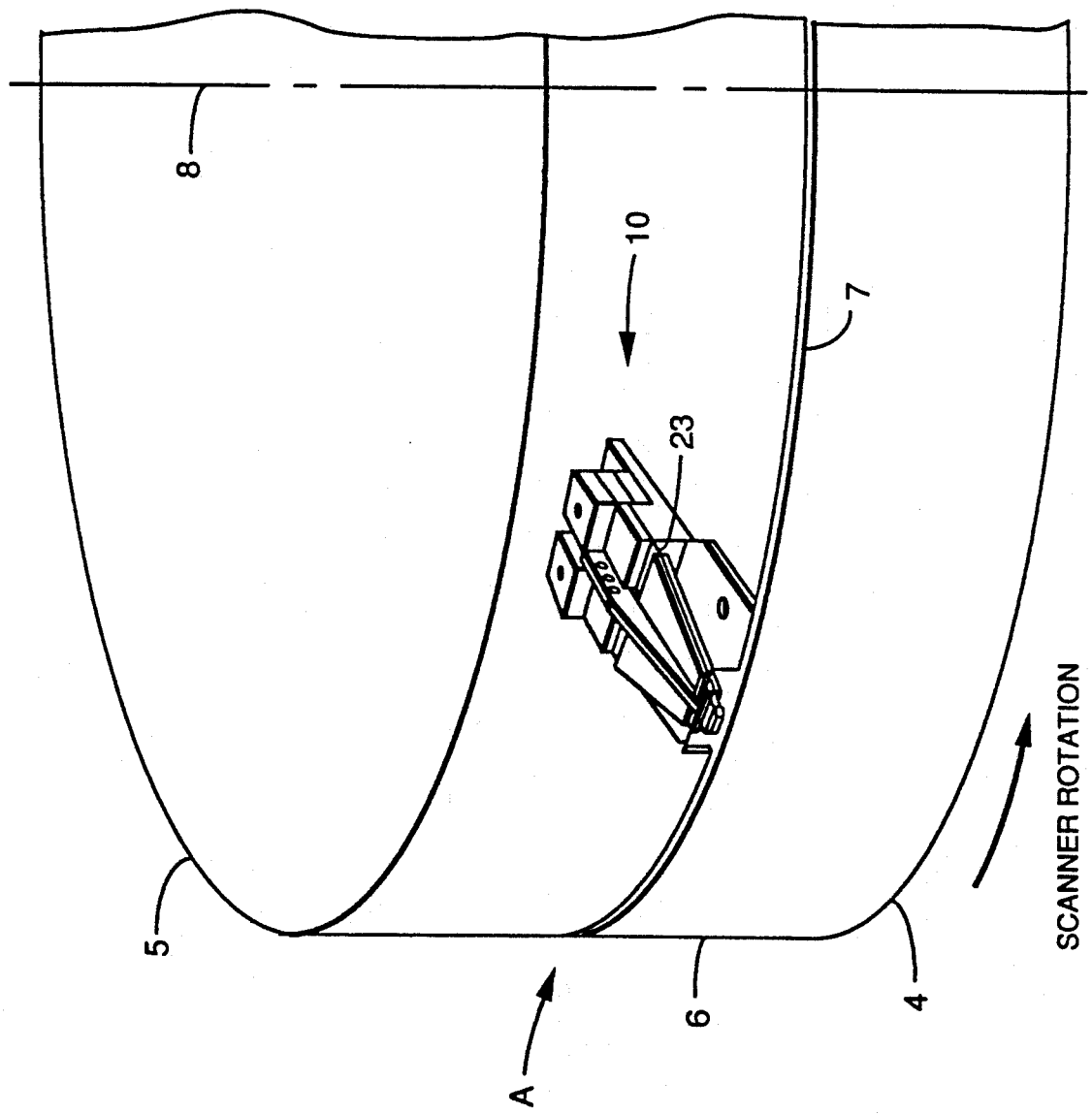
FIG. 1 is an assembled perspective view of an improved head mounting structure embodying this invention inside a scanning drum.
Figure 2:
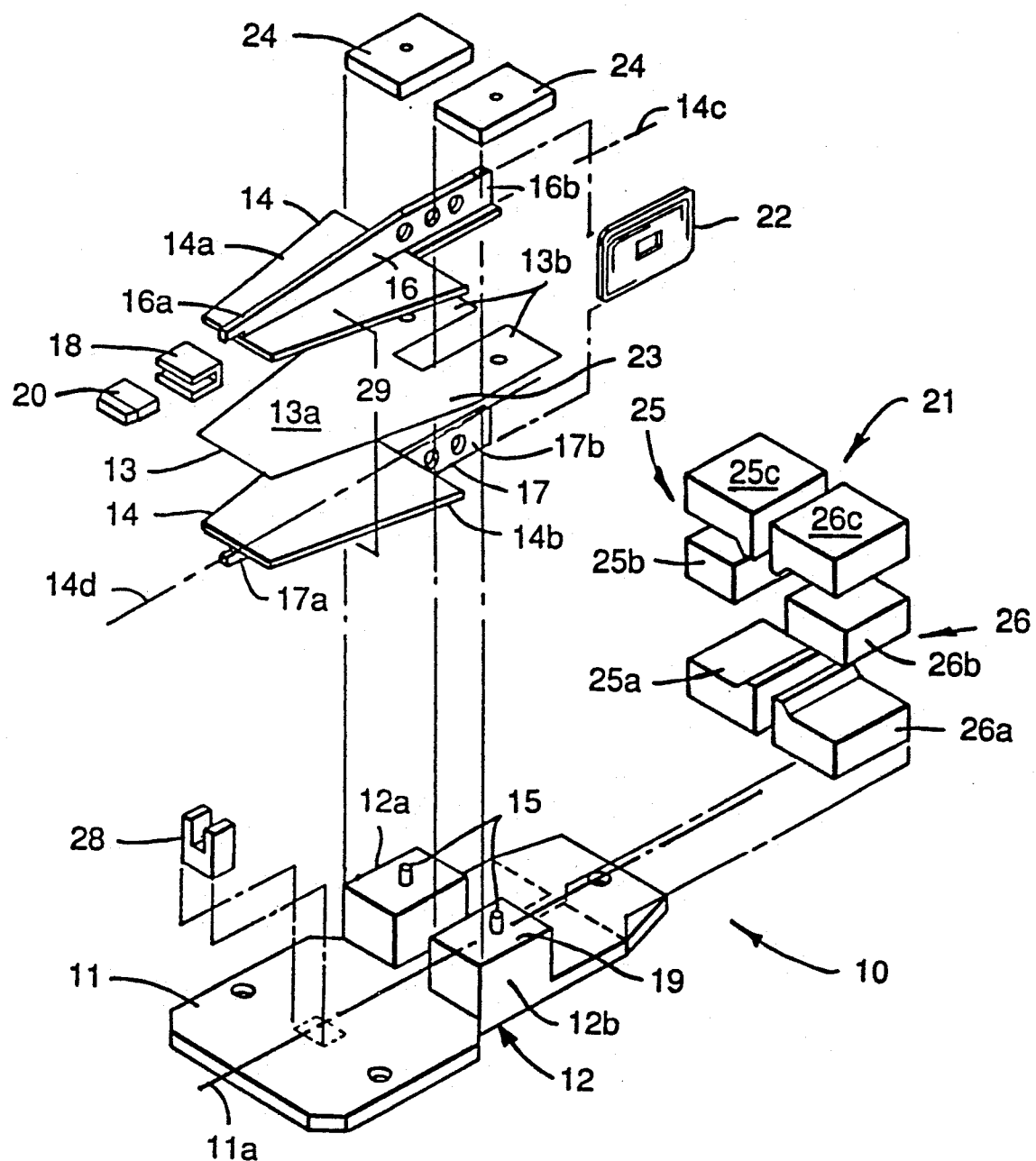
FIG. 2 is an exploded perspective view of the improved head mounting structure of this invention.

As shown in FIGS. 1 and 2, a head mounting structure or assembly 10 is disposed for mounting in an upper rotating drum 5 of a scanner assembly A of a video or data recorder (not shown).

In a preferred embodiment of the invention, a scanner assembly A is shown in FIG. 1, and comprises a stationary drum 4 and a rotatable drum 5 having a cylindrical outer surface 6. A window opening (not shown) in the rotatable drum surface projects a diagonal trace on a tape helically wrapped across surface 6. A stationary structure 10 supports a read-write-record head against a magnetic tape on drum surface 6. Drum 5 rotates about drum axis 8.

In a preferred embodiment of the head mounting structure 10 of the present invention, an elongated base plate 11, see FIG. 2, incorporates at a mid-portion thereof a beam support 12 comprising a pair of members 12a and 12b spaced on opposite sides of a longitudinal base plate center line 11a. Mounted on support 12 is an elongated beam flexure member or flex plate 13 having a thickness substantially less than its length or its width, thus rendering flex plate 13 readily bendable along its length. The radially inner end portion of flex plate 13 overlies base plate members 12a and 12b. Inner end portion 13b of flexible plate 13 is bifurcated, providing a spacing therein equal to the spacing between the beam support members 12a and 12b.

The terms "inner" and "outer" as used herein mean proximate to and remote from, respectively, drum axis 8. Also "inner" and "outer" are the equivalent of the terms "rear" and "front" or "forward", respectively, as used herein.

Inner base cover plates 24 overlie the inner or rear portion 13b of the flex plate 13 disposed on the beam support members 12a and 12b. Assembly and alignment of the rear portion 13b of the flex plate 13 on the beam support members 12a and 12b is facilitated by dowel pins 15 mounted on respective upper faces 19 of beam support members 12a and 12b to be received in corresponding openings in opposite rear arms 13b of flex plate 13 and corresponding openings in the base cover plates 24. With the inner base cover plates 24 so placed, the rear portion 13b of flex plate 13 between the members 12 and the cover plates 24 is stiffened to eliminate bending thereof.

A pair of clamp plates 14 are disposed above and below flex plate 13 forward of members 12a and 12b to sandwich a front or outer portion 13a of flex plate 13 therebetween. Clamp plates 14 are substantially rigid and serve to stiffen the front portion 13a of the flex plate 13 forward of the beam support members 12a and 12b and thereby to prevent bending of flex plate front portion 13a.

A substantially rigid longitudinal beam 16 is secured to an upper face 14a of an upper clamp plate 14 and extends generally along a longitudinal center line 14c thereof, and a similar substantially rigid, second lower longitudinal beam 17 is secured to a lower face 14b of a lower clamp plate 14 and extends along a longitudinal center line 14d thereof and in generally parallel alignment with the upper beam 16. At respective outer ends 16a and 17a, forward of the outer end of flex plate 13 and outer clamp plates 14, the beams 16 and 17 hold therebetween and support a head shoe 18 and a magnetic read/write head 20 contained in shoe 18. Beams 16 and 17 extend rearwardly between spaced beam support members 12a, 12b and their associated base cover plates 24 to support, between their respective inner ends 16b and 17b an associated moving coil 22, which is part of a magnetic motor drive assembly 21. Inner ends 16b and 17b of beams 16 and 17, respectively, extend rearwardly of beam support members 12a and 12b. In structure 10, the longitudinal axes of the beams 16 and 17 are aligned with the longitudinal center line 11a of the base plate 11.

With the outer and inner portions 13a, 13b of the flex plate 13 so stiffened as to prevent or minimize bending thereof, a head support beam assembly 29 is defined by flex plate 13, clamp plates 14 and the beams 16, 17 with a flexure or flex hinge 23 defined by and located between the rear edge of the stiffened forward portion 13a and the forward edge of the stiffened rear portion 13b of the flex plate 13. Disposed at a forward, outer end of the head support beam assembly 29 is the magnetic recording head 20, with the moving coil 22 disposed at an opposite, inner end of assembly 29. Movement of assembly 29 about flex hinge 23 with movement induced in coil 22 by motor drive assembly 21 results in corresponding but opposite movement of head 20. A position sensor 28 on base plate 11 is aligned with and adjacent to head 20 to electronically sense the spatial position of the latter.

The motor drive assembly 21 is mounted on the base plate 11 rearwardly of beam support 12 and includes laterally spaced magnet assemblies 25 and 26 with motor coil 22 disposed therebetween. Magnet assembly 25 includes a lower magnetic pole piece 25a, mounted on base plate 11, behind beam support member 12a. A magnet 25b is mounted to overlie the pole piece 25a, and an upper pole piece 25c is mounted to complete magnet assembly 25. Magnet assembly 26 is mounted on base plate 11 behind right hand beam support member 12b and has constituent elements including a lower magnetic pole piece 26a, a magnet 26b, and an upper magnetic pole piece 26c in assembled relation.

Magnet assemblies 25, 26 are so disposed on the base 12 as to provide a spacing therebetween comparable to the spacing between the members 12a, 12b to enable unrestricted pivotal movement of the coil 22 about the hinge 23 and between the magnet assemblies 25, 26. Flex hinge 23 also enables correspondence between the movement of the head 20 and the movement of the coil 22. That is, a motor input which drives the coil 22 a controlled distance in one direction, also correspondingly drives head 20, but in the opposite direction.

A position sensor 28 associated with the head support assembly 10 is mounted on base plate 11 adjacent to head 20.

Figure 3:
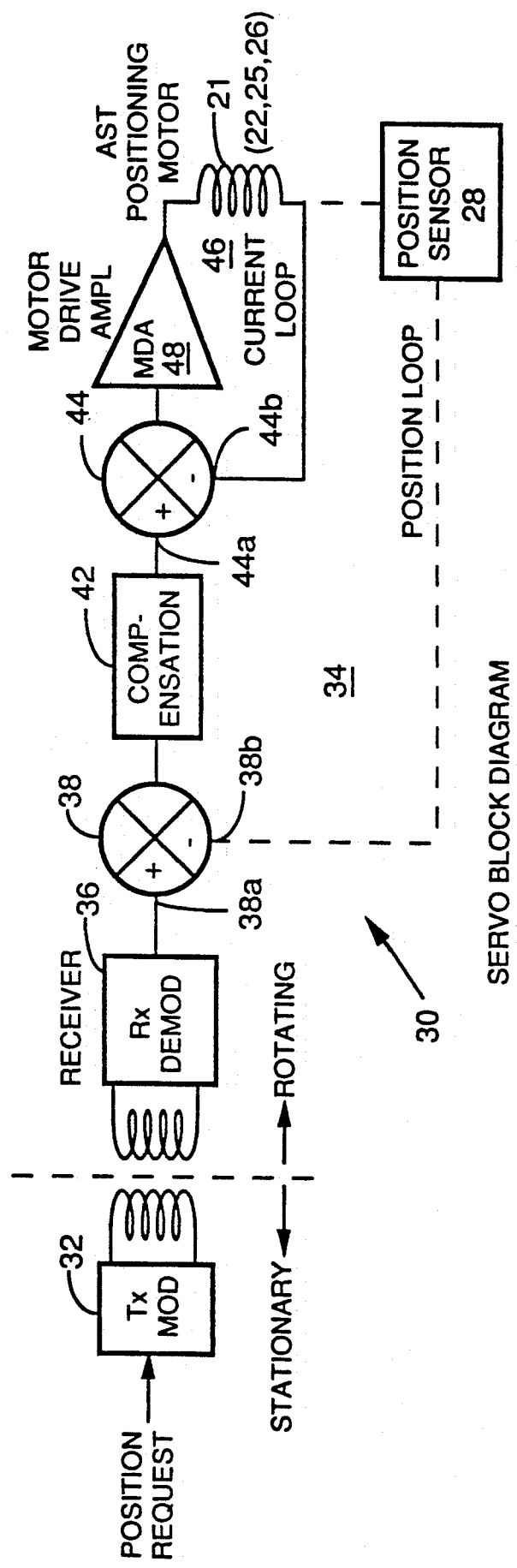
FIG. 3 is a servo circuit for driving the magnetic head mounted on the improved head mounting structure of the present invention.

Various techniques can be employed to drive head 20 through corresponding movement of coil 22. Representative head positioning circuitry is the automatic tracking servo circuit shown in FIG. 3.

Automatic tracking servo circuit 30 comprises a transmitter modulator 32 which delivers a signal constituting a position request to the position loop 34 of servo circuit 30. A receiver demodulator 36 transmits the position request signal from the transmitter modulator 32 to a first input 38a of a summing junction 38 of position loop 34. A second input 38b of summing junction 38 receives the signal output of position sensor 28 associated with magnetic head 20. Summing junction 38 combines the signal inputs from receiver demodulator 36 and position sensor 28 to output an error signal to a compensator 42. The signal output of the compensator 42 is then fed into first input 44a of a summing junction 44, comprising part of a current loop 46 of servo circuit 30.

Current loop 46 provides a feedback signal from head positioning motor assembly 21 to a second input 44b of summing junction 44. The output of summing junction 44 is then applied to a motor drive amplifier 48 whose output drives motor 21 to drive, i.e., position moving coil 22, with resultant positioning of magnetic recording head 20.

As seen in FIG. 2, the improved head mounting structure 10 offers substantial advantages over the prior art. Structure 10 comprises a series of simple, easily formed, easily assembled, and easily replaceable parts. Bending of the head support beam assembly 29 is concentrated at the flex hinge 23. Structure 10 is so oriented as to dispose recording head 20 at the peripheral surface 6 of the scanner drum 5 with the relatively heavy magnet assemblies 25, 26 disposed at the rear of the base plate 11 nearest to the drum rotational axis 8 of scanner drum A1 to minimize centrifugal forces thereon associated with rotating drum 5. Mounting moving coil 22 and magnet assemblies 25, 26 at the inner ends 16b, 17b of beams 16, 17, respectively, remote from magnetic head 20, minimizes or eliminates magnetic interference between these two components.

With head support structure 10 so defined, substantial advantages accrue as compared to a cantilevered head mounting structure for a magnetic recording head 20. In a cantilevered head mounting structure, a recording head 20 displaced from a centered position encounters centrifugal or "g" forces associated with the rotary movement of the scanner which forces the return of the recording head 20 to a centered position.

In the head mounting structure 10 of the present invention, a motor drive input to coil 22 induces movement thereof on one side of the hinge 23 and produces corresponding but opposite movement of recording head 20 on the opposite side of hinge 23. That is, when "g" forces are exerted on the head 20, corresponding forces are also exerted on motor coil 22 on the side of the hinge 23 opposite recording head 20 to at least partially compensate for, and act oppositely to, the "g" forces exerted on head 20.

A corollary advantage is produced by the torque moments occurring about flex hinge 23. If the mass of the head $20 = M_1$ and the mass of the motor coil $22 = M_2$, and the length of the moment arm from the center of the hinge 23 to the center of mass $M_1$ of head 20 can be set at $L_1$, then the length of the moment arm from the center of flex hinge 23 to the center of mass $M_2$ of coil 22 can be set at $L_2$, so as to equalize the torque moments about the flex hinge 23 according to the well-known formula $$M_1 L_1 = M_2 L_2$$

Such a balancing of forces between the head 20 and the coil 22 in head mounting structure 20 substantially reduces the component of motion of the head 20 which is parallel to the rotational axis of scanner drum 5 operating in a vibrational environment. A cantilevered structure offers no such balancing of forces and requires active servo input to control the vibrational component of motion described above. The structure of the present invention reduces the need for such active servo input.

Having described a preferred embodiment of the present invention, it should be evident that other embodiments are possible in the description set forth herein. Accordingly the claims provided below define the invention.

What is claimed is:

1. An improved support structure for a magnetic recording head, said structure comprising:
    at least one support member,
    a longitudinal head support assembly having stiffened front and rear portions thereof, said head support assembly being mounted on said support member, said stiffened front portion of the head support assembly being disposed forward of the support member, the front and rear portions of the head support assembly being so stiffened as to minimize bending therein and defining therebetween a flexure hinge;
    the longitudinal head support assembly having a front end forward of the stiffened front portion thereof and a rear end rearward of the support member;
    a magnetic recording head mounted on the front end of the head support assembly; and
    a motor drive assembly comprising a moving coil mounted at the rear end of the head support assembly and magnetic elements disposed rearwardly of the support member at the rear end of the head support assembly, the magnetic elements being disposed adjacent to the moving coil, and means to energize said coil to induce movement of the coil and cause corresponding movement in the magnetic head at the front end of the head support assembly.

2. The support structure according to claim 1 wherein the front end of said assembly extends forward of said front portion of the assembly, said magnetic head being mounted on said front end of the assembly.

3. The support structure according to claim 1 in which said stiffened front and rear portions of the head support assembly comprise front and rear portions, respectively, of a flexure member, said assembly also having first and second front clamp plates mounted on opposite sides of the front portion of the flexure member so as to stiffen same.

4. The support structure according to claim 3 wherein said first and second clamp plates have longitudinal beams each with front and rear ends, said beams extending adjacent to and rearwardly of the beam support member in generally parallel alignment.

5. The support structure according to claim 4 wherein said beams support between them, at their front and rear ends, the magnetic head and the moving coil, respectively.

6. The support structure according to claim 5 wherein a head shoe is mounted at respective front ends of the beams, said head being supported in said shoe.

7. The support structure according to claim 6 with a position sensor disposed on a base plate adjacent to the magnetic head, said sensor being responsive to spatial positions of said head for generating an electrical signal indicative thereof as an input to the motor drive assembly.

8. The support structure according to claim 3 wherein at least one base cover plate overlies and is mounted over the rear portion of the head support assembly mounted on the support member, a beam flexure member mounted between the support member and the base cover plate to stiffen the rear portion of the flexure member therebetween, so as to substantially minimize the movement of said rear portion of the flexure member.

9. The support structure according to claim 1, wherein the magnetic elements of the motor drive assembly are spaced apart on opposite sides of the moving coil to provide magnetic interaction therewith and with portions thereof spaced apart to permit unrestricted movement of the coil therebetween as the latter moves about the flex hinge.

10. The support structure according to claim 9 wherein the magnetic elements comprise first and second magnetic assemblies disposed on opposite sides, respectively, of the moving coil therebetween as the latter moves about the hinge, each magnetic assembly comprising a lower pole piece mounted on a base plate, a magnet mounted to overlie the lower pole piece, and an upper pole piece to overlie the magnet.

11. The support structure according to claim 9 wherein each magnetic assembly comprises an upper magnet, a lower magnet, and a connecting outer pole piece therebetween.

12. A support structure for a magnetic head, said structure comprising:
a base plate;
at least one beam support member mounted approximately at a midportion of the base plate;
a longitudinal support assembly having a flexure member having front and rear portions thereof, said rear portion overlying and being mounted on said support member, at least one clamp plate being mounted on the front portion of the flexure member forward of the support member, the clamp plate and the support member being affixed to respective front and rear portions, respectively, of the flexure member to stiffen those portions so as to minimize bending therein and to define a flexure hinge therebetween;
at least one beam-like extension on the clamp plate having opposite ends and being mounted on the clamp plate with one end projecting from the clamp plate and the other end being adjacent to and projecting rearwardly from the beam support member;
a magnetic recording head mounted at said one end of the clamp plate;
a moving coil mounted at said other end of the beam-like extension; and
a motor drive assembly comprising magnetic members disposed on the base plate behind the beam support member at the other end of the extension, said assembly having magnetic elements adjacent to the moving coil to provide a magnetic interaction therewith to induce movement of the coil and produce corresponding movement of the magnetic head at said one end of the extension.

13. A support structure for a magnetic head, said structure comprising:
a base plate;
a pair of beam support members mounted in spaced relation generally at a midportion of the base plate;
a longitudinal flexure member having forward and rear ends, said flexure member having a bifurcated rear portion overlying and secured to said spaced beam support members, respectively, top and bottom clamp plates being mounted on a forward portion of the flexure member to stiffen the front portion of the flexure member therebetween, base cover plates overlying the beam support members and the rear portion of the flexure member therebetween so as to minimize bending in said front and rear portions and to define a flex hinge between said front and rear portions of the flexure member;
at least one beam-like extension on one of the clamp plates having opposite ends extending forwardly and rearwardly, respectively, of said clamp plates and to extend between and rearwardly of the support members;
a magnetic head mounted at the forward end of the clamp plates;
a moving coil mounted at the rearward end of said extension; and
a motor drive assembly comprising magnetic members disposed on the base plate rearwardly of the support members at the rearward end of said extension, the magnetic members including first and second magnet assemblies, said assemblies being spaced apart and adjacent to the moving coil to permit the latter to move therebetween and to provide magnetic interaction with the coil and to produce corresponding movement in the magnetic head at the forward end of the flexure member.

14. A support structure according to claim 13 wherein the forward end of said extension projects forwardly of the forward ends of the clamp plates and the flexure member and for supporting the magnetic head.

15. A support structure according to claim 13 wherein a second beam-like extension is mounted on the other clamp plate and extends adjacent to and rearwardly of the beam support member in generally parallel alignment with the other beam-like extension.

16. A support structure according to claim 15 wherein said beam-like extensions support between them at the respective forward ends thereof, a magnetic head, and at respective rearward ends thereof, the moving coil of the motor drive assembly.

17. A support assembly according to claim 16 wherein a head shoe is mounted at the respective forward ends of the extensions for supporting the magnetic head therein.

18. A support structure according to claim 17 wherein a position sensor is disposed on the base plate adjacent to the magnetic head, said sensor being responsive to spatial positions of said head for generating an electrical signal indicative thereof as an input to the motor drive assembly.

19. A support structure according to claim 13 wherein at least one base cover plate overlies and is mounted on the beam support member, the rear portion of the flexure member being mounted between the beam support members and the base cover plate to stiffen same.

20. A support structure for a magnetic head, said structure comprising:
a base plate having front and rear ends;
at least one beam support member mounted on and approximately at the midportion of the base plate;
a head support assembly having a flexure member with a rear portion thereof overlying and mounted on said support member.
at least one clamp plate mounted on the portion of the flexure member forward of the support member, the clamp plate and the support member being affixed to respective front and rear portions of the flexure member to stiffen said front and rear portions thereof so as to minimize bending in said front and rear portions and to define a flexure hinge between said front and rear portions of the flexure member;
said clamp plate having at least one extension with opposite ends and being mounted on the clamp plate and extending adjacent to and rearwardly of the beam support member;
a magnetic head mounted at an forward end of the clamp plate;
a moving coil mounted at the rear end of said extension; and
a motor drive assembly comprising magnetic elements disposed on the base plate to the rear of the beam support member at the rear end of the extension, the magnetic elements being adjacent to the moving coil to provide magnetic interaction therewith,
means to electrically energize said coil to induce movement thereof and produce corresponding movement of the magnetic head at the forward end of the extension.

21. An improved head support structure for a magnetic head, said structure comprising:
a base plate having forward and rear ends and a longitudinal center line;
a pair of beam support members mounted in spaced relation at approximately the midportion of the base plate;
a beam flexure member having front and rear portions, said rear portion being bifurcated and overlying and engaging said spaced beam support members, respectively, upper and lower clamp plates mounted on a front portion of the beam flexure member and sandwiching the same therebetween to stiffen said front portion of the beam flexure member, rear base cover plates overlying the beam support members to stiffen the rear portion of the beam flexure member therebetween and defining a flex hinge between said front and rear portions of the flexure member;
at least one beam-like extension on one of the clamp plates having opposite ends and mounted to overlie the clamp plates and extending between and rearwardly of the beam support members;
a magnetic head mounted at an forward end of the clamp plates;
a moving coil mounted at an rear end of said extension;
a motor drive assembly comprising magnetic elements disposed on the base plate to the rear of the beam support members at the rear end of the extension, the magnetic elements comprising first and second magnet assemblies, said assemblies being spaced apart to permit said coil to move therebetween and being adjacent to said coil so as to magnetically interact therewith, and
means to electrically energize said coil to induce movement of the coil and to produce corresponding movement of the magnetic head on the other side of the flex hinge and at the forward end of the clamp plate.

22. A support assembly according to claim 21 wherein a second beam-like extension on the lower clamp plate is aligned with said extension on the upper clamp plate, said extensions being generally aligned with the longitudinal center line of the base plate, having forward ends projecting forwardly from said clamp plates and supporting therebetween at their forward ends the magnetic head, and supporting therebetween at their rearward ends to the rear of the beam support members, said coil of the motor drive assembly.

* * * * *